UNITED STATES PATENT OFFICE.

MARK W. MARSDEN, OF PHILADELPHIA, PENNSYLVANIA.

POTTERY PRODUCT.

968,379. Specification of Letters Patent. Patented Aug. 23, 1910.

No Drawing. Application filed January 11, 1910. Serial No. 537,473.

*To all whom it may concern:*

Be it known that I, MARK W. MARSDEN, a citizen of the United States, and a resident of Philadelphia, in the county of Philadelphia and State of Pennsylvania, have invented a certain new and useful Pottery Product, of which the following is a specification.

In experimenting with terra cotta, porcelain, and other pottery compositions, I discovered that the addition of a quick setting or hardening medium results in a product that possesses superior fireproof qualities, is dense, and tough, and comparatively light in respect to its bulk. I further found that the consequent rapid handling of the material worked an economy in the manufacture of the material in that fewer forms or molds were required; that the material does not break or crack, and that shrinkage is reduced to the minimum. My present invention contemplates such product.

The setting or hardening medium I employ is Portland or other hydraulic cement and I have obtained excellent results therewith. The proportions are of course variable, according to the nature and quality of the materials employed, but I generally use from twenty to forty per cent. of cement to sixty or eighty per cent. of pottery materials, including clay, kaolin, sand, feldspar, crushed porcelain, etc. To this mass in a pulverulent state is added sufficient water to render it plastic or suitable to be run into forms or molds. The material sets or dries quickly and may be removed from the molds without danger of breaking or cracking and there is little or no shrinkage incident to drying. With regard to the quantity of cement employed it may be here remarked that if forty per cent. be exceeded there is great liability of shrinkage in the burning and if less than twenty per cent. be employed the material will not set up hard. After drying, which I may state requires less than half the time heretofore required in operations of this kind, the building blocks, slabs, tiles or other shaped products may be baked or burned in the usual manner, and they may also be glazed.

My invention is also applicable to brick making and the cement may be combined with the clay to such an extent as to considerably reduce the cost of manufacture without impairing the quality of the product.

Having described the nature and objects of the invention, what I claim as new and desire to secure by Letters Patent is:—

1. A dense, tough, comparatively light, and fire-proof product consisting of from sixty to eighty per cent., more or less, of pottery composition, and twenty to forty per cent., more or less, of a quick setting or hardening medium.

2. A dense, tough, comparatively light, and fireproof product, consisting of from sixty to eighty per cent., more or less, of pottery composition, and twenty to forty per cent., more or less, of Portland cement.

In testimony whereof I have hereunto signed my name to this specification in the presence of two subscribing witnesses.

MARK W. MARSDEN.

Witnesses:
H. A. HEGARTY,
JAS. A. RICHMOND.